(12) United States Patent
Kaneda et al.

(10) Patent No.: US 11,885,616 B2
(45) Date of Patent: Jan. 30, 2024

(54) APPARATUS, METHODS, AND COMPUTER PROGRAMS FOR OBTAINING AN IMAGE OF A SAMPLE

(71) Applicant: Nokia Technologies Oy, Espoo (FI)

(72) Inventors: Noriaki Kaneda, Westfield, NJ (US); Michael Eggleston, Columbus, OH (US)

(73) Assignee: Nokia Technologies, Espoo (FI)

( * ) Notice: Subject to any disclaimer, the term of this patent is extended or adjusted under 35 U.S.C. 154(b) by 294 days.

(21) Appl. No.: 17/416,173

(22) PCT Filed: Dec. 17, 2019

(86) PCT No.: PCT/EP2019/085634
§ 371 (c)(1),
(2) Date: Jun. 18, 2021

(87) PCT Pub. No.: WO2020/127254
PCT Pub. Date: Jun. 25, 2020

(65) Prior Publication Data
US 2022/0057190 A1    Feb. 24, 2022

(30) Foreign Application Priority Data
Dec. 21, 2018 (EP) .................................... 18215640

(51) Int. Cl.
*G01B 9/02* (2022.01)
*G01B 9/02091* (2022.01)
*G01B 9/02004* (2022.01)

(52) U.S. Cl.
CPC ..... *G01B 9/02091* (2013.01); *G01B 9/02004* (2013.01); *G01B 9/02085* (2013.01); *G01B 2210/28* (2013.01); *G01B 2210/52* (2013.01)

(58) Field of Classification Search
CPC ............ G01B 9/02091; G01B 9/02004; G01B 9/02085; G01B 2210/52; G06F 17/15;
(Continued)

(56) References Cited

U.S. PATENT DOCUMENTS 8,502,867 B2    8/2013 Park
8,731,272 B2    5/2014 Adie et al.
(Continued)

OTHER PUBLICATIONS

Mo et al., "Focus-extension by Depth-encoded Synthetic Aperture in Optical Coherence Tomography", Optics Express, vol. 21, No. 8, 2013, pp. 10048-10061.

(Continued)

*Primary Examiner* — Uzma Alam
*Assistant Examiner* — Jonathon Cook
(74) *Attorney, Agent, or Firm* — Harrington & Smith (57) ABSTRACT

An apparatus comprising means for: causing illumination of different areas of a sample with an optical frequency imaging beam at different positions at different times, wherein adjacent positions are configured to cause the corresponding areas to at least partially overlap; receiving signals indicative of back-scattering of the optical frequency imaging beam from the sample at the different times; and processing the received signals to obtain an image of the sample, wherein processing the received signals compensates for phase variations between the different positions at the different times using a matched filter derived from a scattering model of the sample.

19 Claims, 5 Drawing Sheets

(58) Field of Classification Search
CPC ...... G06F 17/153; G06F 17/156; G06F 17/14; G06G 7/1928
See application file for complete search history.

(56) References Cited

U.S. PATENT DOCUMENTS

| | | | |
|---|---|---|---|
| 8,939,582 B1 | 1/2015 | Spaide et al. | |
| 2009/0086216 A1 | 4/2009 | Marks et al. | |
| 2014/0218744 A1 | 8/2014 | De Boer et al. | |
| 2018/0228363 A1 | 8/2018 | Frisken et al. | |
| 2019/0129026 A1* | 5/2019 | Sumi | G01S 15/8915 |

OTHER PUBLICATIONS

Ralston et al., "Interferometric Synthetic Aperture Microscopy", OPN Optics & Photonics News, Jun. 2010, pp. 33-38.

Yu et al., "Improved Lateral Resolution in Optical Coherence Tomography by Digital Focusing Using Two Dimensional Numerical Diffraction Method", Optics Express, vol. 15, No. 12, 2007, pp. 7634-7641.

Ralston et al., "Real-time interferometric synthetic aperture microscopy", Optics Express, vol. 16, No. 4, 2008, pp. 2555-2569.

Extended European Search Report received for corresponding European Patent Application No. 18215640.6, dated Jun. 25, 2019, 8 pages.

Yuan et al., "Alignment analyses of a galvanometer-based scanner in free-space Fourier domain optical coherence tomography", Applied Optics, vol. 54, No. 32, 2015, pp. 9554-9562.

International Search Report and Written Opinion received for corresponding Patent Cooperation Treaty Application No. PCT/EP2019/085634, dated Mar. 16, 2020, 12 pages.

Office action received for corresponding European Patent Application No. 18215640.6, dated Aug. 5, 2022, 5 pages.

* cited by examiner

FIG. 11B

APPARATUS, METHODS, AND COMPUTER PROGRAMS FOR OBTAINING AN IMAGE OF A SAMPLE

RELATED APPLICATION

This application was originally filed as PCT Application No. PCT/EP2019/085634, filed on Dec. 17, 2019, which claims priority from European Application No. 18215640.6, filed on Dec. 21, 2018, each of which is incorporated herein by reference in its entirety.

TECHNOLOGICAL FIELD

Embodiments of the present disclosure relate to apparatus, methods, and computer programs for obtaining an image of a sample. Some relate to apparatus, methods, and computer programs for obtaining an image estimating an internal structure of a sample.

BACKGROUND

Image resolution is related to aperture size. Increasing the size of an aperture causes improved resolution of images of objects at the associated focal depth. Increasing the size of the aperture also increases the rate of image resolution degradation with depth-wise displacement of objects from the focal depth. Mechanical readjustment of the focal depth may be used to image a three-dimensional scene with acceptable image resolution across a range of depths in the scene.

BRIEF SUMMARY

According to various, but not necessarily all, embodiments there is provided an apparatus comprising means for: causing illumination of different areas of a sample with an optical frequency imaging beam at different positions at different times, wherein adjacent positions are configured to cause the corresponding areas to at least partially overlap; receiving signals indicative of back-scattering of the optical frequency imaging beam from the sample at the different times; and processing the received signals to obtain an image of the sample, wherein processing the received signals compensates for phase variations between the different positions at the different times using a matched filter derived from a scattering model of the sample.

According to various, but not necessarily all, embodiments there is provided a method comprising: causing illumination of different areas of a sample with an optical frequency imaging beam at different positions at different times, wherein adjacent positions are configured to cause the corresponding areas to at least partially overlap; receiving signals indicative of back-scattering of the optical frequency imaging beam from the sample at the different times; and processing the received signals to obtain an image of the sample, wherein processing the received signals compensates for phase variations between the different positions at the different times using a matched filter derived from a scattering model of the sample.

According to various, but not necessarily all, embodiments there is provided a computer program that, when run on a computer, performs: causing illumination of different areas of a sample with an optical frequency imaging beam at different positions at different times, wherein adjacent positions are configured to cause the corresponding areas to at least partially overlap; and processing signals indicative of back-scattering of the optical frequency imaging beam from the sample at the different times to obtain an image of the sample, wherein processing the signals compensates for phase variations between the different positions at the different times using a matched filter derived from a scattering model of the sample.

A non-transitory computer readable medium comprising program instructions stored thereon for performing at least the following: causing illumination of different areas of a sample with an optical frequency imaging beam at different positions at different times, wherein adjacent positions are configured to cause the corresponding areas to at least partially overlap; and processing signals indicative of back-scattering of the optical frequency imaging beam from the sample at the different times to obtain an image of the sample, wherein processing the signals compensates for phase variations between the different positions at the different times using a matched filter derived from a scattering model of the sample.

An apparatus comprising: at least one processor; and at least one memory including computer program code, the at least one memory and the computer program code configured to, with the at least one processor, cause the apparatus at least to perform: causing illumination of different areas of a sample with an optical frequency imaging beam at different positions at different times, wherein adjacent positions are configured to cause the corresponding areas to at least partially overlap; and processing signals indicative of back-scattering of the optical frequency imaging beam from the sample at the different times to obtain an image of the sample, wherein processing the signals compensates for phase variations between the different positions at the different times using a matched filter derived from a scattering model of the sample.

According to various, but not necessarily all, embodiments there is provided an apparatus comprising: illumination control circuitry configured to cause illumination of different areas of a sample with an optical frequency imaging beam at different positions at different times, wherein adjacent positions are configured to cause the corresponding areas to at least partially overlap; and signal processing circuitry configured to process signals indicative of back-scattering of the optical frequency imaging beam from the sample at the different times to obtain an image of the sample, wherein processing the signals compensates for phase variations between the different positions at the different times using a matched filter derived from a scattering model of the sample.

According to various, but not necessarily all, embodiments there is provided an apparatus comprising means for: causing illumination of different areas of a sample with an optical frequency imaging beam at different positions and at different optical frequencies at different times, wherein adjacent positions are configured to cause the corresponding areas to at least partially overlap, wherein the different optical frequencies are narrowband optical frequencies that in combination cover a broader band of optical frequencies; receiving signals indicative of back-scattering of the optical frequency imaging beam from the sample at the different times; and processing the received signals to obtain an image of the sample for the broader band of optical frequencies.

According to various, but not necessarily all, embodiments there is provided a method comprising: causing illumination of different areas of a sample with an optical frequency imaging beam at different positions and at different optical frequencies at different times, wherein adjacent positions are configured to cause the corresponding areas to at least partially overlap, wherein the different optical frequencies are narrowband optical frequencies that in combination cover a broader band of optical frequencies; receiving signals indicative of back-scattering of the optical frequency imaging beam from the sample at the different times; and processing the received signals to obtain an image of the sample for the broader band of optical frequencies.

According to various, but not necessarily all, embodiments there is provided a computer program that, when run on a computer, performs: causing illumination of different areas of a sample with an optical frequency imaging beam at different positions and at different optical frequencies at different times, wherein adjacent positions are configured to cause the corresponding areas to at least partially overlap, wherein the different optical frequencies are narrowband optical frequencies that in combination cover a broader band of optical frequencies; and processing signals indicative of back-scattering of the optical frequency imaging beam from the sample at the different times to obtain an image of the sample for the broader band of optical frequencies.

A non-transitory computer readable medium comprising program instructions stored thereon for performing at least the following: causing illumination of different areas of a sample with an optical frequency imaging beam at different positions and at different optical frequencies at different times, wherein adjacent positions are configured to cause the corresponding areas to at least partially overlap, wherein the different optical frequencies are narrowband optical frequencies that in combination cover a broader band of optical frequencies; and processing signals indicative of back-scattering of the optical frequency imaging beam from the sample at the different times to obtain an image of the sample for the broader band of optical frequencies.

An apparatus comprising: at least one processor; and at least one memory including computer program code, the at least one memory and the computer program code configured to, with the at least one processor, cause the apparatus at least to perform: causing illumination of different areas of a sample with an optical frequency imaging beam at different positions and at different optical frequencies at different times, wherein adjacent positions are configured to cause the corresponding areas to at least partially overlap, wherein the different optical frequencies are narrowband optical frequencies that in combination cover a broader band of optical frequencies; and processing signals indicative of back-scattering of the optical frequency imaging beam from the sample at the different times to obtain an image of the sample for the broader band of optical frequencies.

According to various, but not necessarily all, embodiments there is provided an apparatus comprising: illumination control circuitry configured to cause illumination of different areas of a sample with an optical frequency imaging beam at different positions and at different optical frequencies at different times, wherein adjacent positions are configured to cause the corresponding areas to at least partially overlap, wherein the different optical frequencies are narrowband optical frequencies that in combination cover a broader band of optical frequencies; and signal processing circuitry configured to process signals indicative of back-scattering of the optical frequency imaging beam from the sample at the different times to obtain an image of the sample for the broader band of optical frequencies.

The following portion of this 'Brief Summary' section, describes various features that may be features of any of the embodiments described in the foregoing portion of the 'Brief Summary' section. The description of a function should additionally be considered to also disclose any means suitable for performing that function.

The different areas may lie within an imaging plane.

Causing illumination of different areas of the sample with the optical frequency imaging beam may comprise causing movement of an effective imaging beam source to different positions within an aperture plane at the different times.

Causing movement of an effective imaging beam source may comprise controlling a scanner configured to scan the optical frequency imaging beam across the sample.

The scattering model may be based on phase differences introduced when the optical frequency imaging beam travels from arbitrary positions in an aperture plane to arbitrary positions of putative scattering points in an imaging plane.

The phase differences introduced may be dependent on $\sqrt{X^2+(Y-u)^2}$, where X is the orthogonal distance between the aperture plane and imaging plane, Y is the arbitrary positions of putative scattering points in the imaging plane, and u is the arbitrary positions in the aperture plane.

Processing the received signals to obtain the image may comprise filtering the received signals using the matched filter.

The matched filter may be implemented using digital signal processing and processing the received signals to obtain the image comprises convolution of the received signals with the matched filter over a plurality of arbitrary positions in the aperture plane and a plurality of arbitrary position in the imaging plane.

Processing the received signals to obtain the image may comprise transforming the received signal from a spatial domain into a spatial-frequency domain prior to processing.

The received signals may be based on a superposition, in an interferometer, of back-scattered light from the sample and a reference optical frequency imaging beam.

Illumination of the sample at the different times with the optical frequency imaging beam may be caused at different pair-wise combinations of imaging beam positions and narrowband optical frequencies.

Variation of the narrowband optical frequencies across a broader band of optical frequencies may be caused before causing illumination of different areas of a sample with the optical frequency imaging beam.

Frequency of light emitted from an imaging beam source may be controlled to cause variation of the narrowband optical frequencies across the broader band of optical frequencies.

BRIEF DESCRIPTION

Some example embodiments will now be described with reference to the accompanying drawings in which.

DETAILED DESCRIPTION

Figure 1:
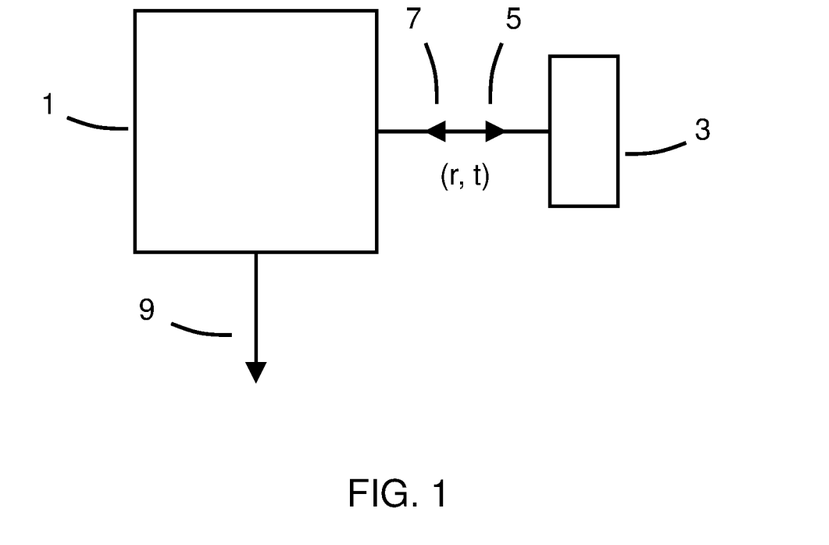
FIG. 1 shows an example of an apparatus as described herein.

FIG. 1 schematically illustrates an example of an apparatus 1. The apparatus 1 causes illumination of different areas 11, 13 (see FIG. 2 below) of a sample 3 with an imaging beam 5 at different positions (r) at different times (t). Of these different positions, adjacent positions are configured to cause the corresponding areas 11, 13 to at least partially overlap. The adjacent positions may be directly adjacent to one another. The adjacent positions may be contiguous.

In the illustrated example, the imaging beam 5 is coherent and comprises a plurality of wavefronts which have a fixed phase relationship for a period of time. For example, the fixed phase relationship is maintained at least over a period of time between emission from a source until incidence upon a sensor. Photons comprised in the imaging beam 5 may thus have a fixed phase relationship over the time required for imaging. The imaging beam 5 may, for example, be comprised of light emitted by a laser.

In some, but not necessarily all, examples the imaging beam 5 comprises electromagnetic radiation in the optical part of the spectrum. The imaging beam 5 is constrained to optical frequencies and is an optical frequency imaging beam. Optical frequencies are those frequencies responsible for visible, ultraviolet, and infrared light. Optical frequencies cover the electromagnetic spectrum in the range of 300 GHz to 3 PHz. The optical frequency imaging beam 5 does not comprise light at radio frequencies.

In some, but not necessarily all, examples, particularly where the apparatus 1 finds applications in the medical sciences or in personal systems including personal health systems or personal fitness systems, the imaging beam 5 may be comprised of frequencies which are not strongly absorbed by human tissues, such as certain near-infrared frequencies, to thereby enable non-contact, non-invasive in vivo imaging. Suitable frequencies may include 200-375 THz (wavelengths of ~0.8-1.5 microns) or 230-340 THz (wavelengths of ~0.9-1.3 microns).

The apparatus 1 receives signals 7 indicative of back-scattering of the imaging beam 5 from the sample 3 at the different times.

The received signals 7 may be received substantially contemporaneously with sensing of back-scattered light 25 (see FIG. 4 below) from the sample 3. In examples where the sensor may be a separate entity to the apparatus 1 there may, in practice, be some small delay between sensing of the back-scattered light 25 and receipt of the signals 7 due to the time taken to transmit the signals 7 from a sensor to the apparatus 1. The delay will be fixed or any variation in the delay will be compensated for. The receipt of the received signals 7 at the different times can enable real time processing of the received signals 7.

In other, but not necessarily all other, examples the received signals 7 are logged at the sensor or a data logging device and are provided altogether to the apparatus 1 at a later time. This later time may be subsequent to the illumination of the sample 3 and the sensing of the back-scattered light 25.

The apparatus 1 processes the received signal 7 to obtain an image 9 of the sample 3.

Figure 4:
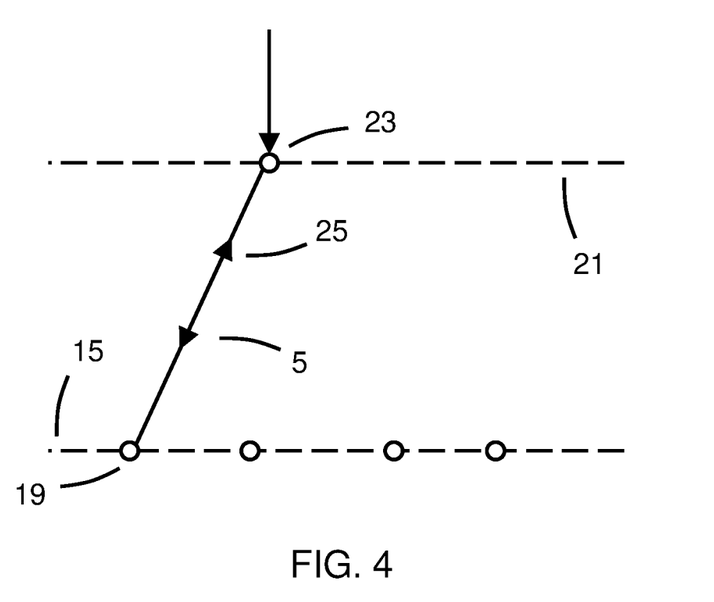
FIG. 4 shows an example of a scattering model as described herein.

In some, but not necessarily all, examples the image 9 represents an estimation of the internal structure of the sample 3. The image 9 may represent an estimation of the distribution or arrangement of scattering points 19 (as shown in FIG. 4 below). In some examples the image 9 is a pixelated image. In such examples the image 9 may have at least intensity values for each pixel in the image and may also have color values for each pixel. Each pixel in the image 9 may also have an associated phase value.

In some, but not necessarily all, embodiments the processing of the received signals 7 compensates for phase variations between the different imaging beam positions at the different times using a matched filter 17 derived from a scattering model.

By compensating for phase variations between the different imaging beam positions at the different times, a series of real aperture images, taken from different positions at different times, can be added together (coherently integrated) to amplify the signal and thus improve the signal-to-noise ratio in the imaging. As a result, the resolution of the image 9 is improved. The effect is similar to taking an image with a single, large real aperture. The addition of the series of real aperture images creates a synthetic aperture image. Creating a synthetic aperture image in this manner, as opposed to an image using a single, large real aperture, avoids the drawbacks inherent with the use of a large real aperture. Such drawbacks include a high rate of image resolution degradation as the imaging depth deviates from the focal depth associated with the aperture.

The apparatus 1 therefore provides an improved resolution over the range of imaging depths that can be achieved.

Optical coherence tomography (OCT) systems are capable of imaging over a range of depths exceeding the range of depths that can be imaged with satisfactory resolution using a single real aperture (whether large or small). Therefore, the use of a single, real aperture is a limiter in respect of the range of depths which can be satisfactorily imaged by the OCT system. Since the apparatus 1 provides improved resolution over a range of imaging depths, when applied in the field of OCT, the apparatus 1 facilitates the OCT system to operate at its full potential, imaging at satisfactory resolution across the OCT system's full range of imaging depths.

Figure 2:
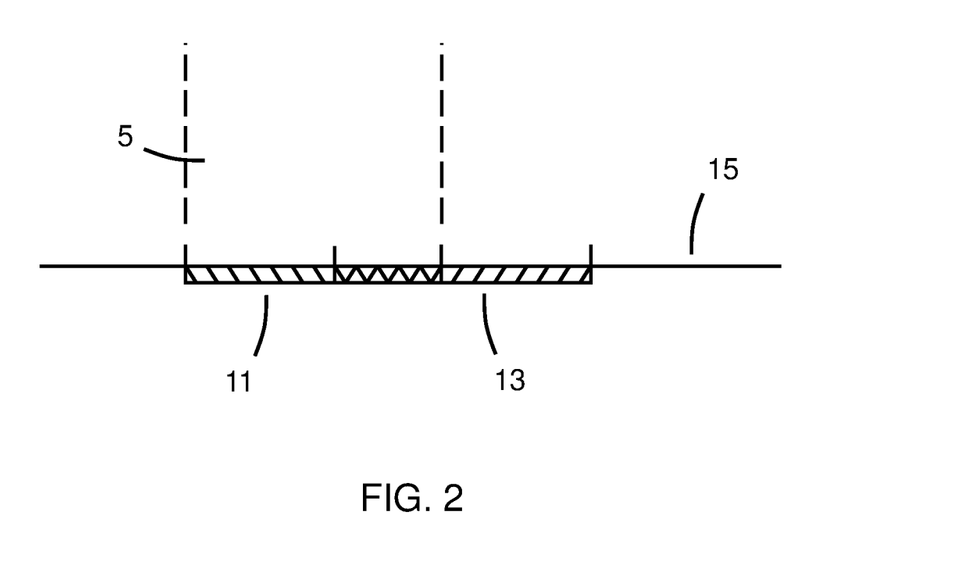
FIG. 2 shows an example of illuminated areas as described herein.

FIG. 2 schematically illustrates an example of overlapping areas 11, 13. The areas 11, 13 illustrated in FIG. 2 correspond with adjacent positions of the imaging beam 5. The different areas 11, 13 lie within a single plane. This single plane defines an imaging plane 15.

While the imaging beam 5 has been described as illuminating areas of the sample 3, it is to be appreciated that the imaging beam 5 may illuminate volumes of the sample 3 and, from adjacent positions, may illuminate partially overlapping volumes of the sample 3 at different times. Within these volumes the sample 3 may comprise many planes in which different areas at least partially overlap. The imaging plane 15 can be selected from any amongst these such planes. As a result, the sample 3 can be imaged at different planes. Different strata or layers of the sample 3 can therefore be imaged. A three-dimensional image of the sample 3 can therefore be formed by combining the images of the different strata.

The imaging plane may be a rectilinear plane. The imaging plane 15 may be a plane in Cartesian space. The imaging plane may be parallel to the focal plane 33 (see FIG. 6) of the optical element for directing the imaging beam 5 at the sample 3.

Figure 3:
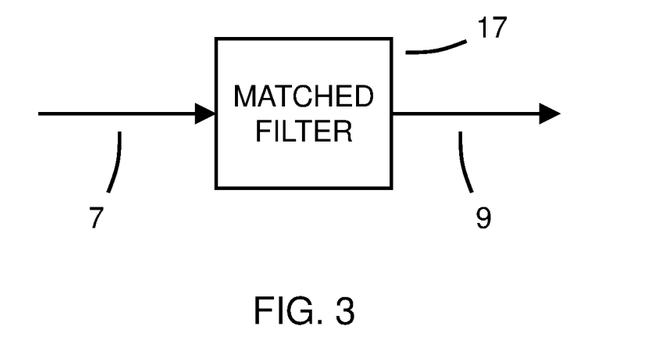
FIG. 3 shows an example a matched filter as described herein.

FIG. 3 schematically illustrates an example of the matched filter 17 that may be used in the processing of the received signals 7.

The processing of the received signals 7 to obtain the image 9 may, in some examples, comprise filtering of the received signals 7 using the matched filter 17. The matched filter 17 is a filter which emphasizes the parts of a received signal 7 which match with an expected response from a putative scattering point in the imaging plane 15. The matched filter 17 therefore maximizes the signal-to-noise ratio in respect of the received signal 7 for such scattering points. The matched filter therefore functions to detect the presence of the expected response in the received signal 7 and highlight scattering points.

In some examples the matched filter 17 is implemented using digital signal processing. In some examples processing the received signal 7 to obtain the image 9 comprises convolution of the received signal 7 with the matched filter 17. This is explained further with reference to FIG. 4 below.

FIG. 4 schematically illustrates an example of the scattering model from which the matched filter 17 can be derived.

This scattering model is based upon phase differences which are introduced when the imaging beam 5 travels from arbitrary positions 23 in the aperture plane 21 to arbitrary positions 19 of putative scattering points in an imaging plane 15. The putative scattering points may be modelled as a unit reflector.

In some examples the phase differences that are introduced are dependent on $\sqrt{X^2+(Y-u)^2}$, where X is the orthogonal distance between the aperture plane 21 and the imaging plane 15, where Y is the arbitrary positions 19 of the putative scattering points in the imaging plane 15, and where u is the arbitrary positions 23 in the aperture plane 21. In the FIG, X is the vertical distance between the planes 21, 19 (and positions 23, 19) and (Y−u) is the horizontal distance between the positions 23, 19. Consequently $2 \cdot \sqrt{X^2+(Y-u)^2}$, represents the direct distance (the path length) between the positions 23, 19.

By way of an explanation, it can be seen from FIG. 4 that the path length of light travelling between the aperture plane 21 and the imaging plane 15 and back is equal to $2 \cdot \sqrt{X^2+(Y-u)^2}$. Phase difference and path length are related by the angular wave number k. Therefore, the expected phase difference that is introduced when the imaging beam 5 travels from the arbitrary positions 23 in the aperture plane 21 to arbitrary positions 19 of putative scattering points in the imaging plane 15 and the resultant back-scattered light 25 travels from the arbitrary positions 19 of putative scattering points in the imaging plane 15 to the arbitrary positions 23 in the aperture plane 21 is $2k \cdot \sqrt{X^2+(Y-u)^2}$.

Therefore, the expected response from a putative scattering point in the scattering model is given by $$e^{-j \cdot 2k \cdot \sqrt{X^2+(Y-u)^2}},$$

where j is the imaginary unit, the square root of −1.

The matched filter 17 is based on this expected response in the scattering model. In some examples the matched filter 17 is the complex conjugate of the expected response in the scattering model. The matched filter 17 in the spatial domain is given by:

$$mf_s = e^{j \cdot 2k \cdot \sqrt{X^2+(Y-u)^2}}.$$

In some examples the arbitrary positions 23 in the aperture plane 21 map to sensor elements (sensels) in a sensor. Therefore, there is a matched filter 17 associated with each sensel.

The matched filter 17 is then used with the actual received signal 7 to estimate the actual distribution arrangement of scattering points in the imaging plane 15. The matched filter 17 may be used to filter the received signals 7 in order to maximize the signal-to noise-ratio for the actual scattering points in the imaging plane. In some examples, the filtering involves convolving the received signals 7 with the matched filter 17 over a plurality of arbitrary positions 23 in the aperture plane 21 and a plurality of arbitrary positions 19 in the imaging plane 15.

A fast convolution can be achieved using a fast Fourier transform (FFT) algorithm such as:

FFT(s*$mf_s$), where s is the received signals 7.

Where there are a plurality of scattering points, the wavefronts of the back-scattered light 25 do not arrive at a sensor at the same time due to the different path lengths that they have travelled. The expected responses therefore overlap from the perspective of the sensor. It can take significant computational resources to resolve these responses so that they can be distinguished from one another to thereby enable an estimate of the distribution or arrangement of the scattering points to be obtained. Digital signal processing in the spatial-frequency domain can avoid these issues.

Therefore, in some examples, processing the received signal 7 to obtain the image 9 comprises transforming the received signal 7 from a spatial domain into a spatial-frequency domain prior to processing. An example of this transformation is illustrated schematically in FIG. 5.

Figure 5:
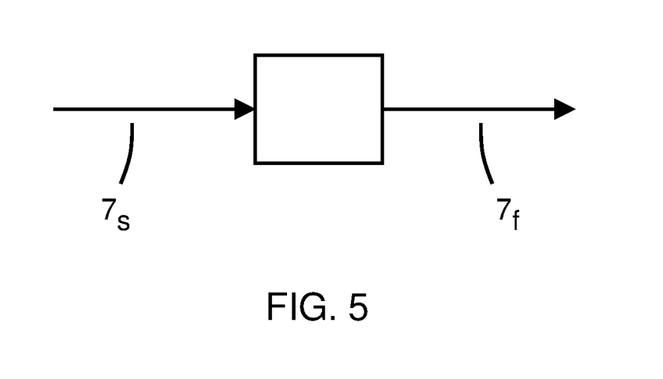
FIG. 5 shows an example of processing as described herein.

FIG. 5 schematically illustrates an example in which the received signal 7 is transformed between different domains. In this figure, the received signal 7 in the spatial domain is referenced as $7_s$ and the received signal 7 in the spatial-frequency domain is referenced as $7_f$. The matched filter 17 in the spatial-frequency domain is given by:

$$mf_f = e^{j \cdot 2k \cdot \sqrt{X^2-u^2}}.$$

A fast convolution to filter the received signal 7 can be achieved with a FFT algorithm such as:

IFFT(FFT(s)*$mf_f$), where, again, s is the received signals 7.

The imaging plane 15 for which an image 9 can be obtained can be numerically selected following the receipt of the signal 7 by choosing an appropriate value for X in the above equations.

In one embodiment, the imaging and processing hereinbefore described may be performed over broadband frequencies. That is, the imaging and processing hereinbefore described may be performed over a set of frequencies which are spread over at least 5 THz, sometimes up to 50 THz. In some examples, the imaging and processing hereinbefore described is performed over a set of frequencies which are spread over more than 50 THz or more than 100 THz.

In another embodiment imaging may be performed over a plurality of narrowband frequencies that in combination cover a broader band of frequencies. That is, the imaging may be performed over different sets of frequencies, where each set is spread over less than 1 THz. The combination of these different sets, via processing, covers a spread of more than 1 THz, for example at least 5 THz. Thus, the processing enables an image 9 to be obtained for the broader band of frequencies.

In the approach to imaging which uses a plurality of narrowband frequencies, the apparatus 1 as shown in FIG. 1 causes illumination of different areas 11, 13 of a sample 3 with an imaging beam 5 at different positions and at different frequencies at different times. These different frequencies are narrowband frequencies that in combination cover a broader band of frequencies.

As described in relation to FIG. 1, the adjacent positions are configured to cause the corresponding areas 11, 13 to at least partially overlap.

The apparatus 1 receives the signal 7 indicative of back-scattering of the imaging beam 5 from the sample 3 at the different times (at different frequencies) and processes the received signal 7 to obtain an image 9 of the sample 3 for the broader band of frequencies.

In some examples the apparatus 1 causes illumination of the sample 3 at the different times with the imaging beam 5 at different pair-wise combinations of positions and narrowband frequencies.

In some of these examples, the apparatus 1 may cause variation of the narrowband frequencies across the broader band of frequencies before causing illumination of the different areas 11, 13 of a sample 3 with the imaging beam 5.

Alternatively, the apparatus 1 may cause illumination of a plurality (including all) of the different areas 11, 13 of a sample 3 at one narrowband frequency at a time and produce one narrowband image at a time. The apparatus 1 receives the signal 7 indicative of back-scattering of the imaging beam 5 from the sample 3 at the different times (at different frequencies) and processes the received signal 7 to obtain a series of narrow band images 9 of the sample 3, which are then combined to create a broadband image.

In some examples the apparatus 1 controls the frequency of light emitted from a light source 27 (see FIG. 6 below) which is used to provide the imaging beam 5. The apparatus 1 may control the frequency of light emitted from a light source 27 to cause variation of the narrowband frequencies across the broader band of frequencies. Any suitable light source may be used for this purpose. In one example, the light source 27 may be a tunable laser such a frequency-swept laser. Examples of a frequency-swept laser include a Fourier-Domain Mode-Locked (FDML) laser. In some examples the frequency-swept laser outputs a single optical frequency for a short period of time, then steps to a higher optical frequency and outputs that for a short period of time. This is done sequentially so that a broader optical bandwidth is swept over by these discrete narrowband frequencies.

If the exact instantaneous frequency of the imaging beam 5 is not known and incorrectly assumed to be the same on every frequency sweep, then an apparent phase offset may be observed from one sweep to the next. Since the image 9 of the sample 3 is based, at least in part, on phase difference between the received signals 7, this is not desired. For this reason, the exact start frequency of the frequency sweep and subsequent frequencies in the sweep are determined in some examples. In some examples this determination can be achieved using an optical wavemeter, a spectrum analyzer, a narrowband optical filter, or any other suitable means.

The processing of the received signals 7 as hereinbefore described is equally applicable to embodiments which image the sample 3 with a broadband frequency and embodiments which image the sample over a plurality of narrowband frequencies which in combination cover a broader band of frequencies.

Figure 6:
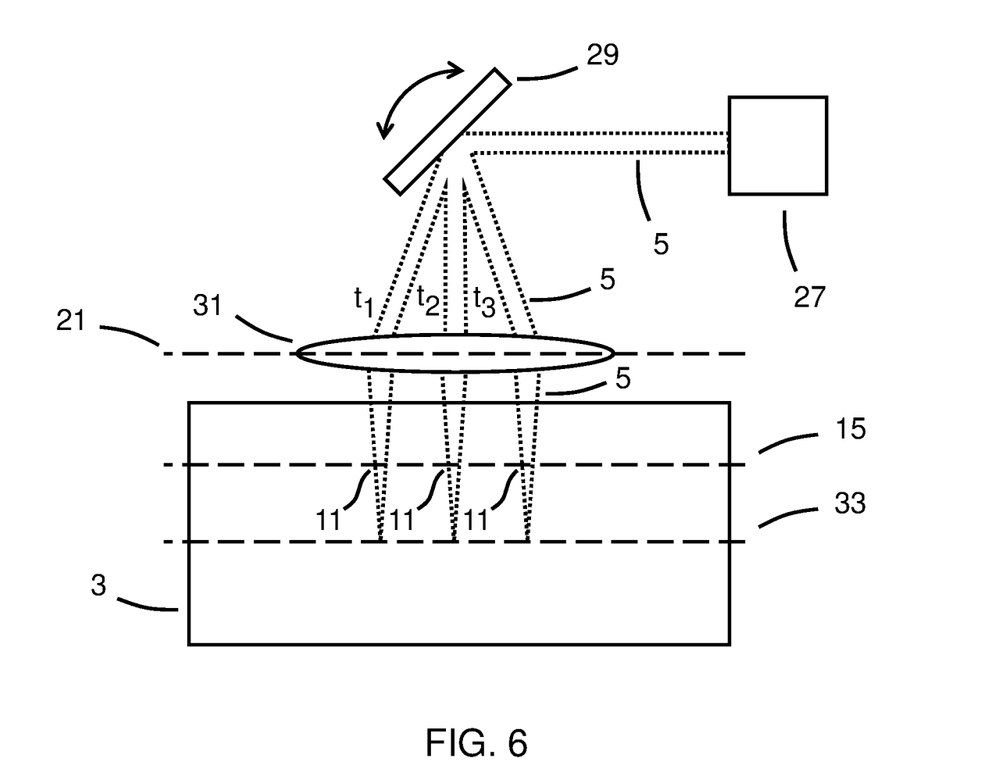
FIG. 6 shows an example of optics as described herein.

FIG. 6 schematically illustrates an example of optics used to image the sample 3.

In some examples illuminating different areas 11 of the sample 3 with the imaging beam 5 is achieved by moving an effective imaging beam source to different positions within an aperture plane 21 at the different times, which are referenced as $t_1$, $t_2$, and $t_3$ in FIG. 6. The effective imaging beam source may be defined by the exit position of the imaging beam 5 from a final optical element which steers the imaging beam 5. In the example illustrated in FIG. 6, the effective imaging beam source may be defined by the exit position of the imaging beam 5 from a lens 31 which focuses the imaging beam 5 onto a position in a focal plane 33.

The movement of the effective imaging beam source creates a synthetic aperture and defines the aperture plane 21. The aperture plane 21 is the plane which comprise the path taken by the effective imaging beam source. In the example illustrated in FIG. 6, the aperture plane 21 is aligned with the lens 31.

The effective imaging beam source can be moved by controlling a scanner 29 which is configured to scan the imaging beam 5 across a part or a whole of the sample 3. The scanner 29 directs the imaging beam 5, emitted by a light source 27, along a direction. Scanning involves moving the scanner to change this direction. In this way the scanner 29 is configured to enable the imaging beam 5 to illuminate a plurality of areas 11 in turn. The scanner 29 may be an optical scanner such as, for example, a movable reflector. A movable reflector may be a movable mirror. The movable mirror may, for example, be a micro-electro-mechanical (MEM) element such as, for example a micro-scanner. The scanner 29 may alternatively comprise any suitable means for varying the area 11, 13. For example the scanner 29 may comprise movable refractive optics, acousto-optic deflectors, or electro-optic deflectors. In some examples the scanner 29 could also be replaced by means, such as actuators, for moving the sample 3. In some examples the scanner 29 could also be replaced by any means suitable for moving an effective imaging beam source relative to the sample 3.

It should be appreciated that in this FIG, the areas 11 are illustrated as non-overlapping. This is only for clarity of illustration. There will be a series of mutually overlapping areas 13 (not illustrated) at a series of times intermediate of $t_1$ and $t_2$ and be a series of mutually overlapping areas 13 (not illustrated) at a series of times intermediate of $t_2$ and $t_3$. The overlapping areas 11, 13 have been described previously with reference to FIG. 2.

Figure 7:
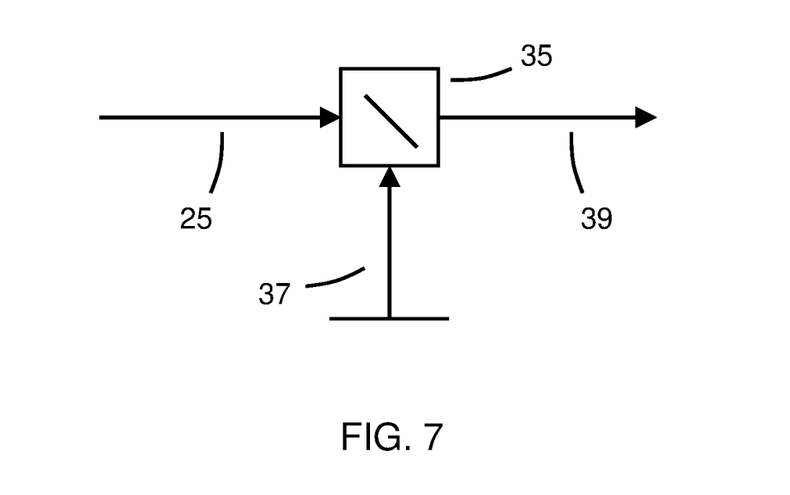
FIG. 7 shows an example of an interferometer as described herein.

FIG. 7 schematically illustrates an example of an optical coupler 35. The optical coupler 35 is used to superimpose back-scattered light 25 from the sample 3 and a reference imaging beam 37. The optical coupler may be implemented as an interferometer or in a silica-based planar lightwave circuit (PLC) or optical fibers.

The received signal 7 may be based upon the resulting superimposed light 39. In some examples the superimposed light 39 may be transduced into an electrical signal by a sensor such as a photosensor. This electrical signal may be processed to obtain data which is embedded into the signal 7 provided to and received by the apparatus 1. For example, the electrical signal output from the photosensor may be in the time domain and a FFT is taken of this signal in order to obtain values for the intensity and phase at each frequency component (which collates with the imaging depth). The FTT may be performed by dedicated digital signal processing circuitry.

The superposition of the back-scattered light 25 and the reference imaging beam 37 produces beats which have a lower frequency than that of the back-scattered light 25. The superposition of the back-scattered light 25 and the reference imaging beam 37 therefore functions to optically down sample the back-scattered light 25 to a lower frequency which enables digital processing. Square law detection is performed with respect to the superimposed light 39 to obtain the beat frequency. In some alternative examples, envelope detection may be performed for the same purpose.

Figure 8:
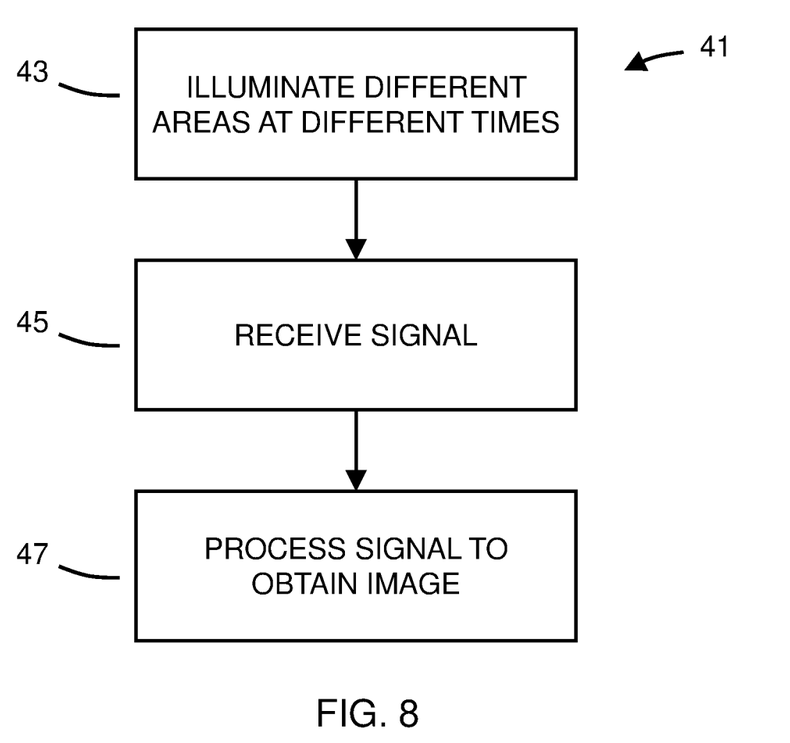
FIG. 8 shows an example of a method as described herein.

FIG. 8 illustrates an example of a method 41 for imaging the sample 3.

At block 43 of the method 41, illumination of different areas 11, 13 for sample 3 with an imaging beam 5 at different positions at different times is caused. As previously mentioned, the different positions are such that adjacent ones of these different positions are configured to cause the corresponding areas 11, 13 to at least partially overlap.

In some examples, block 43 of the method 41 may involve causing illumination of the different areas 11, 13 of the sample 3 with the imaging beam 5 at the different positions and at different frequencies at the different times. This then enables imaging of the sample 3 at a series of different frequencies which may be narrowband frequencies which in combination cover a broader range of frequencies.

At block 45 of the method 41 the signal 7 indicative of back-scattering of the imaging beam 5 from the sample 3 at the different times is received.

At block 47 of the method 41 the received signals 7 are processed to obtain an image 9 of the sample 3.

If block 43 of the method 41 includes illuminating the sample 3 with a plurality of narrowband frequencies, then the processing in block 47 accounts for this to thereby obtain an image 9 of the sample 3 for the broader band of frequencies that the narrowband frequencies, in combination, cover.

In some embodiments the processing of the received signal 7 that is performed may compensate for phase variations between different positions at different times using a matched filter 17 derived from a scattering model. Said scattering model is explained in relation to FIGS. 4 and 5 above.

Figure 9:
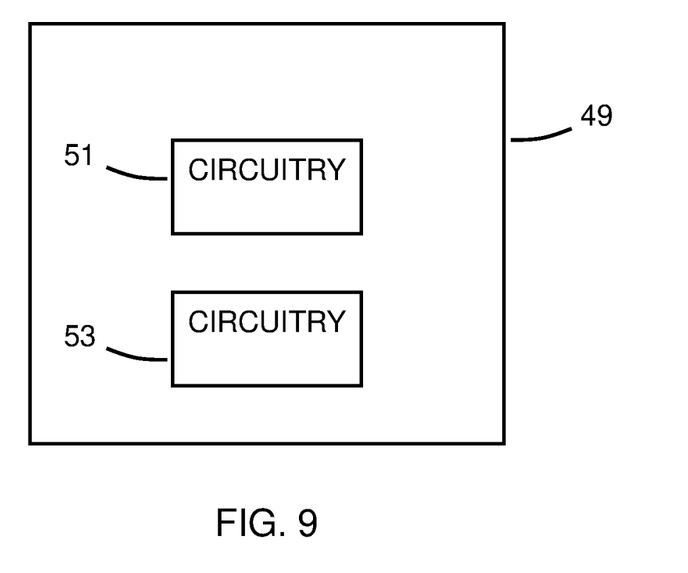
FIG. 9 shows an example of digital circuitry as described herein.

FIG. 9 schematically illustrates an example of digital circuitry 49. The digital circuitry 49 may function as the apparatus 1 or may be comprised within the apparatus 1.

The digital circuitry 49 comprises one or more digital circuits optimized for and dedicated to the methods illustrated in FIG. 8 and/or the imaging and processing that has been hereinbefore described. The strength of this approach is that no central processing unit is required for the implementation of the signal processing.

As illustrated in FIG. 9, the digital circuitry 49 comprises illumination control circuitry 51 and signal processing circuitry 53.

Illumination control circuitry 51 is configured to cause illumination of different areas 11, 13 of a sample 3 with an imaging beam 5 at different positions at different times, wherein adjacent positions are configured to cause the corresponding areas 11, 13 to at least partially overlap.

Signal processing circuitry 53 is configured to process signals 7 indicative of back-scattering of the imaging beam 5 from the sample 3 at the different times to obtain an image 9 of the sample 3.

In some examples the signal processing circuitry 53 is configured to process the signals 7 to compensate for phase variations between the different positions at the different times using a matched filter 17 derived from a scattering model.

In some examples the illumination control circuitry 51 is configured to cause illumination of the different areas 11, 13 of the sample 3 with the imaging beam 5 at the different positions and at different frequencies at the different times. In these examples, the signal processing circuitry 53 is configured to process the signals 7 to obtain an image 9 of the sample 3 for a broader band of frequencies covered by the combination of the different frequencies.

Figure 10:
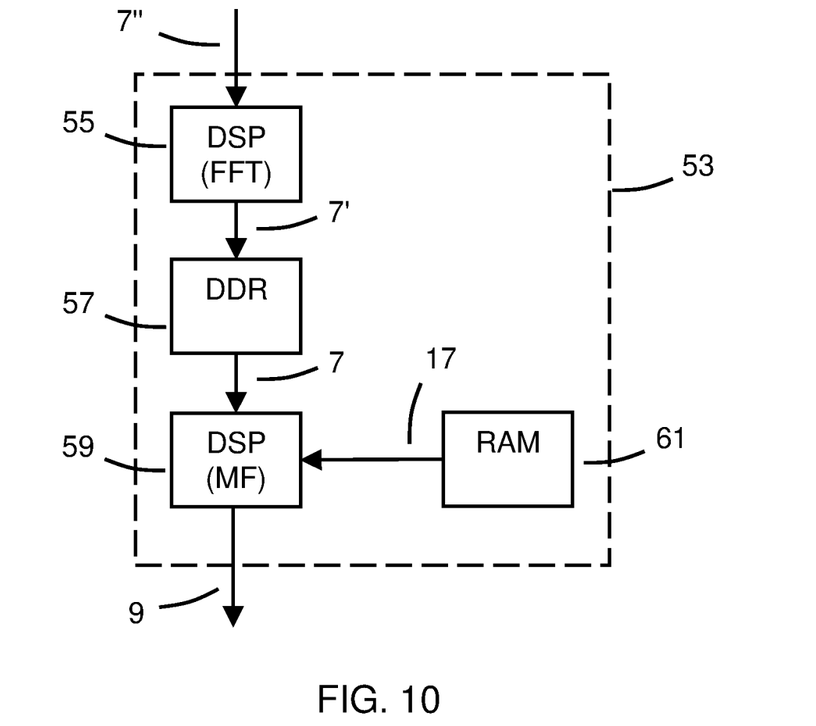
FIG. 10 shows an example of signal processing circuitry as described herein.

FIG. 10 schematically illustrates an example of the signal processing circuitry 53.

A first digital circuit 55 receives electrical signals 7" output from the photosensor. The electrical signals 7" are produced in response to receipt of the superimposed light 39 (referenced in respect of FIG. 7 above) at the photosensor. The electrical signals 7" comprise time domain data over a range of depths of the sample 3.

Time domain data over the range of depths is obtained at each different position r at which the imaging beam 5 is directed at the different times t.

The first digital circuit 55 is implemented by dedicated digital signal processing circuitry (DSP) which is configured to take a FFT of the electrical signals 7" output from the photosensor. The first digital circuit 55 outputs the signals 7' which comprise spatial domain data over the range of depths at each different position r at which the imaging beam 5 is directed at the different times t.

The signals 7' comprising the spatial domain data are conveyed to a double data rate synchronous dynamic random-access memory (DDR) 57 which temporarily stores the spatial domain data for each depth and each different position r.

A second digital circuit 59 is configured to obtain an image 9 of the sample 3 across one or more different imaging planes 15.

The second digital circuit 59 requests subsets of the stored spatial domain data from the double data rate synchronous dynamic random-access memory (DDR) 57. The subsets of data are comprised in the signals 7, received by the second digital circuit 59.

A subset may consist of the spatial domain data stored in the double data rate synchronous dynamic random-access memory (DDR) 57 for a depth corresponding to a particular imaging plane 15. Each subset may consist of data corresponding to different imaging planes 15. Subsequent processing of data in a subset, by the second digital circuit 59, produces an image 9 of the sample 3 in the particular imaging plane 15. A three-dimensional image of the sample 3 can be formed by combining the images 9 of the samples in different imaging planes 15.

All positions in a single imaging plane 15 have the same depth coordinate. Positions in the imaging plane 15 may be further described by their abscissa and ordinate. In some examples, an image 9 of the sample 3 in the imaging plane 15 is built up strip-wise. In such examples the subset of stored spatial domain data requested by the second digital circuit 59 may consist of data corresponding to a fixed depth and a fixed, first abscissa (or ordinate). Subsequent processing of this subset produces an image of a breadth-wise (or length-wise) strip of the sample 3 at a fixed depth and abscissa (or ordinate). To build up an image of the imaging plane 15 strip-wise, further subsets may be requested, consisting of data corresponding to a fixed depth and a fixed abscissa (or ordinate) which differs from the first abscissa (or ordinate). Subsequent processing of these further subsets produces images of breadth-wise (or length-wise) strips of the sample 3 at a fixed depth and a different, fixed abscissae (or ordinates).

In addition to receiving the signals 7 comprising subsets of the stored spatial domain data from the double data rate synchronous dynamic random-access memory (DDR) 57, the second digital circuit 59 also receives a matched filter 17 from a random-access memory (RAM) 61.

The second digital circuit 57 is implemented by dedicated digital signal processing circuitry (DSP) which is configured to perform the convolution of the signals 7 with the matched filter (MF) 17 as described in relation to FIG. 4 above. In some examples, the second digital circuit 59 is configured to perform a fast convolution of the signals 7 with the matched filter 17 using a FFT.

In some examples, though not in the example shown in FIG. 10, another digital circuit may be used to transform the spatial domain data comprised in the signals 7 from the spatial domain into a spatial-frequency domain prior to processing at the second digital circuit 59 as described in relation to FIG. 5 above.

Data traffic between the memories 57 and 61 and the second digital circuit 59 reduces the usage of a central processor unit.

Figure 11A:
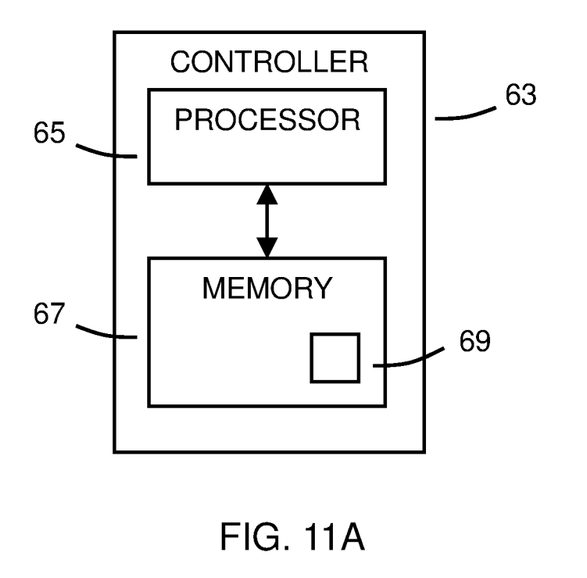
FIG. 11A shows an example of a controller as described herein.

FIG. 11A schematically illustrates an example of a controller 63. The controller 63 may function as the apparatus 1 or may be comprised within the apparatus 1.

Implementation of a controller 63 may be as controller circuitry. The controller 63 may be implemented in hardware alone, have certain aspects in software including firmware alone or can be a combination of hardware and software (including firmware).

As illustrated in FIG. 11A the controller 63 may be implemented using instructions that enable hardware functionality, for example, by using executable instructions of a computer program 69 in a general-purpose or special-purpose processor 65 that may be stored on a computer readable storage medium (disk, memory etc.) to be executed by such a processor 65.

The processor 65 is configured to read from and write to the memory 67. The processor 65 may also comprise an output interface via which data and/or commands are output by the processor 65 and an input interface via which data and/or commands are input to the processor 65.

The memory 67 stores a computer program 69 comprising computer program instructions (computer program code) that controls the operation of the apparatus 1 when loaded into the processor 65. The computer program instructions, of the computer program 69, provide the logic and routines that enables the apparatus 1 to perform the methods illustrated in FIG. 8 and/or the imaging and processing that has been hereinbefore described. The processor 65 by reading the memory 67 is able to load and execute the computer program 69.

The apparatus 1 therefore comprises:
at least one processor 65; and
at least one memory 67 including computer program code
the at least one memory 67 and the computer program code configured to, with the at least one processor 65, cause the apparatus 1 at least to perform:
causing illumination of different areas 11, 13 of a sample 3 with an imaging beam 5 at different positions at different times, wherein adjacent positions are configured to cause the corresponding areas 11, 13 to at least partially overlap; and
processing signals 7 indicative of back-scattering of the imaging beam 5 from the sample 3 at the different times to obtain an image 9 of the sample 3

In some embodiments the at least one memory 67 and the computer program code are configured to, with the at least one processor 65, cause the apparatus 1 to perform processing of the received signals 7 which compensates for phase variations between the different positions at the different times using a matched filter 17 derived from a scattering model.

In some embodiments the at least one memory 67 and the computer program code are configured to, with the at least one processor 65, cause the apparatus 1 to perform: causing illumination of the different areas 11, 13 of the sample 3 with the imaging beam 5 at the different positions and at different frequencies at the different times; and processing of the received signals 7 to obtain an image 9 of the sample 3 for a broader band of frequencies covered by the combination of the different frequencies.

Figure 11B:
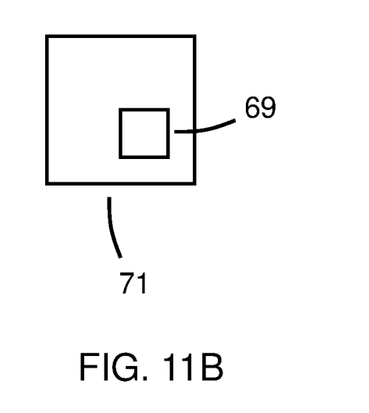
FIG. 11B shows an example of a delivery mechanism as described herein.

As illustrated in FIG. 11B, the computer program 69 may arrive at the apparatus 1 via any suitable delivery mechanism 71. The delivery mechanism 71 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid state memory, an article of manufacture that comprises or tangibly embodies the computer program 69. The delivery mechanism may be a signal configured to reliably transfer the computer program 69. The apparatus 1 may propagate or transmit the computer program 69 as a computer data signal.

Computer program instructions for causing an apparatus to perform at least the following or for performing at least the following:
causing illumination of different areas 11, 13 of a sample 3 with an imaging beam 5 at different positions at different times, wherein adjacent positions are configured to cause the corresponding areas 11, 13 to at least partially overlap; and
processing signals 7 indicative of back-scattering of the imaging beam 5 from the sample 3 at the different times to obtain an image 9 of the sample 3

In some embodiments the computer program instructions are additionally for performing or for causing an apparatus to perform processing of the received signals 7 which compensates for phase variations between the different positions at the different times using a matched filter 17 derived from a scattering model.

In some embodiments the computer program instructions are additionally for performing or for causing an apparatus to perform: causing illumination of the different areas 11, 13 of the sample 3 with the imaging beam 5 at the different positions and at different frequencies at the different times; and processing of the received signals 7 to obtain an image 9 of the sample 3 for a broader band of frequencies covered by the combination of the different frequencies.

The computer program instructions may be comprised in a computer program, a non-transitory computer readable medium, a computer program product, a machine readable medium. In some but not necessarily all examples, the computer program instructions may be distributed over more than one computer program.

Although the memory 67 is illustrated as a single component/circuitry it may be implemented as one or more separate components/circuitry some or all of which may be integrated/removable and/or may provide permanent/semi-permanent/dynamic/cached storage.

Although the processor 65 is illustrated as a single component/circuitry it may be implemented as one or more separate components/circuitry some or all of which may be integrated/removable. The processor 65 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' may refer to one or more or all of the following:
(a) hardware-only circuitry implementations (such as implementations in only analog and/or digital circuitry) and
(b) combinations of hardware circuits and software, such as (as applicable):
(i) a combination of analog and/or digital hardware circuit(s) with software/firmware and
(ii) any portions of hardware processor(s) with software (including digital signal processor(s)), software, and memory(ies) that work together to cause an apparatus, such as a mobile phone or server, to perform various functions and
(c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

The blocks illustrated in FIG. 8 may represent steps in a method and/or sections of code in the computer program 69. The illustration of a particular order to the blocks does not necessarily imply that there is a required or preferred order for the blocks and the order and arrangement of the block may be varied. Furthermore, it may be possible for some blocks to be omitted.

The apparatus 1 of FIG. 1 may be or may comprise the digital circuit 49 of FIG. 9 or the controller 63 of FIG. 11A or may be any computer or machine capable of reading the computer program 69 from the delivery mechanism 71 of FIG. 11B and running that computer program 69. In some examples, the apparatus 1 of FIG. 1 may also comprise one or more of the following elements: the light source 27, the scanner 29, the lens 31, the interferometer 39, and one or more sensors (not shown). The apparatus 1 of FIG. 1 may also comprise any more circuitry, controllers, or other means associated with the aforementioned elements and which enable the aforementioned elements to perform the functions described in relation to them in the foregoing description.

It is to be appreciated that the apparatus 1 may comprise any suitable means for performing the functions hereinbefore described.

Consequently, in some examples, the apparatus 1 comprises means for:
causing illumination of different areas 11, 13 of a sample 3 with an imaging beam 5 at different positions at different times, wherein adjacent positions are configured to cause the corresponding areas 11, 13 to at least partially overlap;
receiving signals 7 indicative of back-scattering of the imaging beam 5 from the sample 3 at the different times; and
processing the received signals 7 to obtain an image 9 of the sample 3, wherein processing the received signals 7 compensates for phase variations between the different positions at the different times using a matched filter 17 derived from a scattering model.

Additionally or alternatively, the apparatus 1 comprises means for:
causing illumination of different areas 11, 13 of a sample 3 with an imaging beam 5 at different positions and at different frequencies at different times, wherein adjacent positions are configured to cause the corresponding areas 11, 13 to at least partially overlap, wherein the different frequencies are narrowband frequencies that in combination cover a broader band of frequencies;
receiving signals 7 indicative of back-scattering of the imaging beam 5 from the sample 3 at the different times; and
processing the received signals 7 to obtain an image 9 of the sample 3 for the broader band of frequencies.

Where a structural feature has been described, it may be replaced by means for performing one or more of the functions of the structural feature whether that function or those functions are explicitly or implicitly described.

In some but not necessarily all examples, the apparatus 1 is configured to communicate data from the apparatus 1 with or without local storage of the data in a memory 53 at the apparatus 1 and with or without local processing of the data by circuitry or processors at the apparatus 1.

The data may, for example, be the image 9 of the sample 3 at one or more image planes 15 or data produced by the processing of said images.

The data may be stored in processed or unprocessed format remotely at one or more devices. The data may be stored in the Cloud.

The data may be processed remotely at one or more devices. The data may be partially processed locally and partially processed remotely at one or more devices.

The data may be communicated to the remote devices wirelessly via short range radio communications such as Wi-Fi or Bluetooth, for example, or over long range cellular radio links. The apparatus may comprise a communications interface such as, for example, a radio transceiver for communication of data.

The apparatus 1 may be part of the Internet of Things forming part of a larger, distributed network.

The processing of the data, whether local or remote, may be for the purpose of health monitoring, data aggregation, patient monitoring, vital signs monitoring or other purposes.

The processing of the data, whether local or remote, may involve artificial intelligence or machine learning algorithms. The data may, for example, be used as learning input to train a machine learning network or may be used as a query input to a machine learning network, which provides a response. The machine learning network may for example use linear regression, logistic regression, vector support machines or an acyclic machine learning network such as a single or multi hidden layer neural network.

The processing of the data, whether local or remote, may produce an output. The output may be communicated to the apparatus 1 where it may produce an output sensible to the subject such as an audio output, visual output or haptic output.

The above described examples find application as enabling components of three-dimensional (3D) laser scanning imaging systems, including but not limited to: optical coherence tomography (OCT) for both medical imaging and physiological sensing; OCT for industrial applications such as non-destructive evaluation of materials, characterizations of chemicals and solutions; and coherent LI DAR for 3D sensing such as in autonomous driving vehicles and automated industrial equipment.

The term 'comprise' is used in this document with an inclusive not an exclusive meaning. That is any reference to A comprising B indicates that A may comprise only one B or may comprise more than one B. If it is intended to use 'comprise' with an exclusive meaning then it will be made clear in the context by referring to "comprising only one . . . " or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although embodiments have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain embodiments, those features may also be present in other embodiments whether described or not.

The term 'a' or 'the' is used in this document with an inclusive not an exclusive meaning. That is any reference to A comprising a/the B indicates that A may comprise only one B or may comprise more than one B unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer and exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

We claim:

1. An apparatus comprising:
   a beam generator configured to cause illumination of different areas of a sample with an optical frequency imaging beam at different positions at different times, wherein adjacent positions are configured to cause the corresponding areas to have portions which at least partially overlap;
   a detector configured to receive signals indicative of back-scattering of the optical frequency imaging beam from the sample at the different times; and
   circuitry comprising at least one processor configured to process the received signals to obtain an image of the sample, wherein processing of the received signals compensates for phase variations between the different positions at the different times using a matched filter derived from a scattering model of the sample, and at least partially add images of the different areas together which have the overlap portions,
   wherein the different areas lie within an imaging plane which is different from a focal plane, and wherein the processing of the received signals compensates for the phase variations including for the overlap portions of the added together images at the imaging plane.

2. The apparatus as claimed in claim 1 wherein causing illumination of different areas of the sample with the optical frequency imaging beam comprises causing movement of an effective imaging beam source to different positions within an aperture plane at the different times.

3. The apparatus as claimed in claim 2 wherein causing movement of the effective imaging beam source comprises controlling a scanner configured to scan the optical frequency imaging beam across the sample.

4. The apparatus as claimed in claim 2 wherein the scattering model is based on phase differences introduced when the optical frequency imaging beam travels from arbitrary positions in the aperture plane to arbitrary positions of putative scattering points in the imaging plane.

5. The apparatus as claimed in claim 4 wherein the phase differences introduced are dependent on $\sqrt{X^2+(Y-u)^2}$, where X is the orthogonal distance between the aperture plane and imaging plane, Y is the arbitrary positions of putative scattering points in the imaging plane, and u is the arbitrary positions in the aperture plane.

6. The apparatus as claimed in claim 1 wherein processing the received signals to obtain the image comprises filtering the received signals using the matched filter.

7. The apparatus as claimed in claim 4 wherein the matched filter is implemented using digital signal processing and processing the received signals to obtain the image comprises convolution of the received signals with the matched filter over a plurality of arbitrary positions in the aperture plane and a plurality of arbitrary position in the imaging plane.

8. The apparatus as claimed in claim 6 configured to cause transforming the received signal from a spatial domain into a spatial-frequency domain prior to processing the received signals.

9. The apparatus as claimed in claim 1 wherein the received signals are based on a superposition, in an interferometer, of back-scattered light from the sample and a reference optical frequency imaging beam.

10. The apparatus as claimed in claim 1 configured to cause illumination of the sample at the different times with the optical frequency imaging beam at different pair-wise combinations of imaging beam positions and narrowband optical frequencies.

11. The apparatus as claimed in claim 10 configured to cause variation of the narrowband optical frequencies across a broader band of optical frequencies before causing illumination of different areas of the sample with the optical frequency imaging beam.

12. A method comprising:
causing illumination of different areas of a sample with an optical frequency imaging beam at different positions at different times, wherein adjacent positions are configured to cause the corresponding areas to have portions which at least partially overlap;
receiving signals indicative of back-scattering of the optical frequency imaging beam from the sample at the different times; and
processing the received signals to obtain an image of the sample, wherein the processing of the received signals compensates for phase variations between the different positions at the different times using a matched filter derived from a scattering model of the sample, and at least partially adds images of the different areas together which have the overlap portions,
wherein the different areas lie within an imaging plane which is different from a focal plane, and wherein the processing of the received signals compensates for the phase variations including for the overlap portions of the added together images at the imaging plane.

13. The method as claimed in claim 12 wherein the different areas lie within an imaging plane.

14. The method as claimed in claim 13 wherein causing illumination of different areas of the sample with the optical frequency imaging beam comprises causing movement of an effective imaging beam source to different positions within an aperture plane at the different times.

15. The method as claimed in claim 12 wherein the processing comprises filtering the received signals using the matched filter.

16. An apparatus comprising:
illumination control circuitry configured to cause illumination of different areas of a sample with an optical frequency imaging beam at different positions at different times, wherein adjacent positions are configured to cause the corresponding areas to have portions which at least partially overlap; and
signal processing circuitry configured to process signals indicative of back-scattering of the optical frequency imaging beam from the sample at the different times to obtain an image of the sample, wherein processing the signals compensates for phase variations between the different positions at the different times using a matched filter derived from a scattering model of the sample, and at least partially adds images of the different areas together which have the overlap portions,
wherein the different areas lie within an imaging plane which is different from a focal plane, and wherein the processing of the received signals compensates for the phase variations including for the overlap portions of the added together images at the imaging plane.

17. The apparatus as claimed in claim 16 wherein the different areas lie within an imaging plane.

18. The apparatus as claimed in claim 16 wherein the process comprises filtering the received signals using the matched filter.

19. The apparatus as claimed in claim 18 configured to cause transforming the received signal from a spatial domain into a spatial-frequency domain prior to processing the received signals.

* * * * *